United States Patent [19]

Gottwald et al.

[11] Patent Number: 4,770,420
[45] Date of Patent: Sep. 13, 1988

[54] VEHICLE MOUNTING SYSTEM FOR IMPACT ABSORPTION APPARATUS

[75] Inventors: William H. Gottwald, San Diego; Michel N. Bandak, Alamo; Thomas N. Bitzer, Danville, all of Calif.

[73] Assignee: United Research and Manufacturing, Inc., Costa Mesa, Calif.

[21] Appl. No.: 6,047

[22] Filed: Jan. 22, 1987

Related U.S. Application Data

[62] Division of Ser. No. 691,253, Jan. 14, 1985, Pat. No. 4,658,941.

[51] Int. Cl.$^4$ .................... B60R 19/22; B60R 19/26; B60R 19/36
[52] U.S. Cl. .................................. 293/104; 293/109; 293/110; 293/118; 293/133; 293/155; 256/13.1; 188/377; 248/596; 16/281; 16/282
[58] Field of Search ............... 293/103, 104, 107, 109, 293/110, 118, 131–134, 155, 102, 120; 256/13.1; 188/377; 248/596; 16/281, 282

[56] References Cited

U.S. PATENT DOCUMENTS

| | | | |
|---|---|---|---|
| 1,457,330 | 6/1923 | Wharton | 293/131 |
| 2,091,195 | 8/1937 | Dennebaum | 256/13.1 X |
| 3,552,694 | 1/1971 | Flannelly | 293/104 |
| 3,739,882 | 6/1973 | Schwenk et al. | 293/120 X |
| 3,802,727 | 4/1974 | Beckley | 293/120 |
| 3,913,963 | 10/1975 | Persicke | 293/15 |
| 4,008,915 | 2/1977 | Walker | 293/102 |
| 4,200,310 | 4/1980 | Carney, III | 293/132 X |
| 4,221,413 | 9/1980 | Bonnetain | 188/377 X |
| 4,247,138 | 1/1981 | Child | 293/103 |
| 4,277,593 | 10/1981 | Bricmont et al. | 293/133 X |
| 4,372,595 | 2/1983 | Roberts | 293/131 |
| 4,541,661 | 9/1985 | Hawk | 293/117 |
| 4,635,981 | 1/1987 | Friton | 293/1 |

FOREIGN PATENT DOCUMENTS 678223 8/1979 Australia ............................. 188/377

Primary Examiner—Dennis H. Pedder
Attorney, Agent, or Firm—Townsend and Townsend

[57] ABSTRACT

A mounting system for a vehicle-mounted impact absorption box filled with a collapsible open cell network provides a lessened tendency for disintegration when subjected to the vibrations of the vehicle. The system contains a bolt surrounded by a region of transverse cells, with the bolt bonded to the cell walls and passing therethrough in a generally perpendicular direction. A further feature of the system is a pivot bracket constructed in two parts—a rigid portion and a pivot arm, the latter stabilized by springs which absorb torsional impulses on the arm arising from the vehicle vibrations. These two features work in conjunction with each other in reducing shock damage to the interior of the box, and thereby increase the life expectancy of the box as a whole.

1 Claim, 3 Drawing Sheets

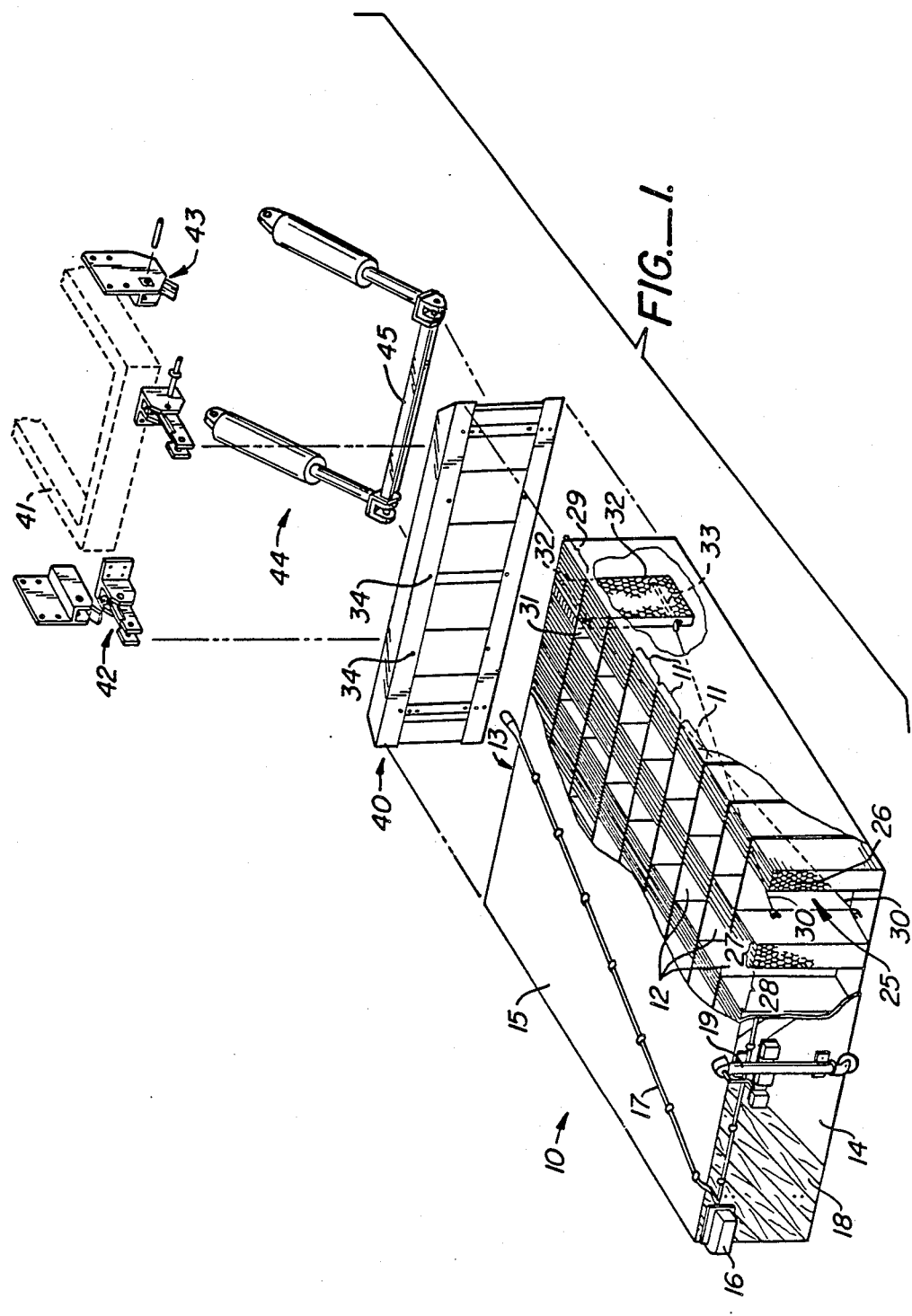

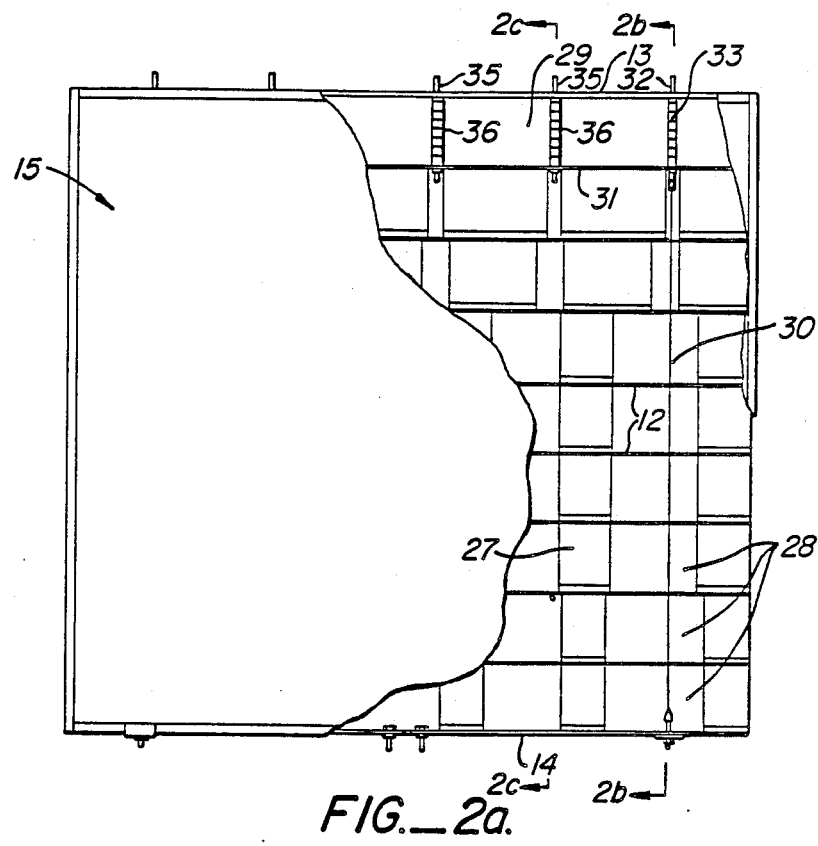
FIG._2a.
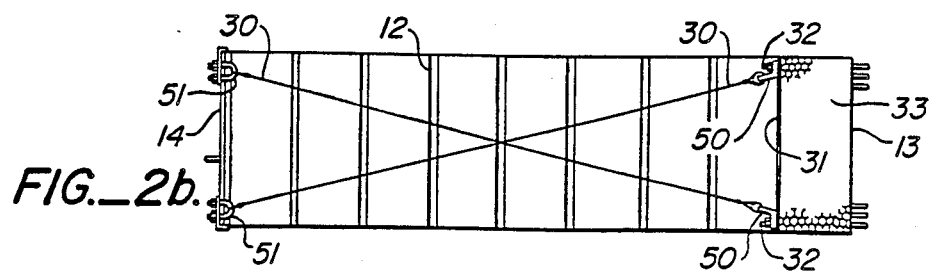
FIG._2b.
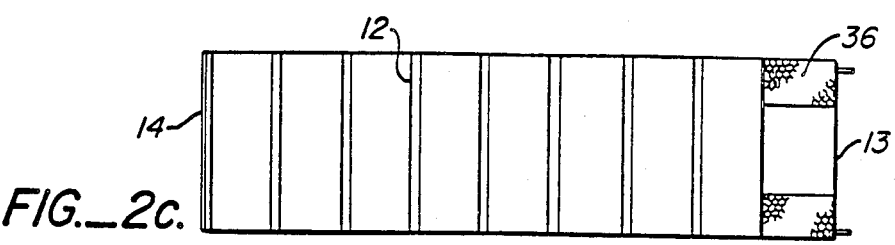
FIG._2c.

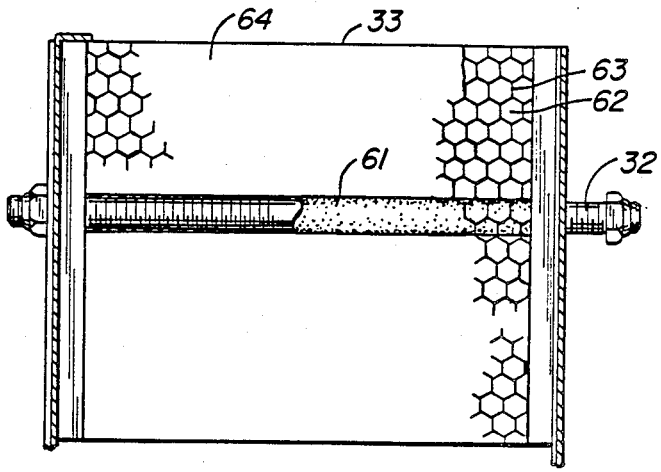
FIG._3b.
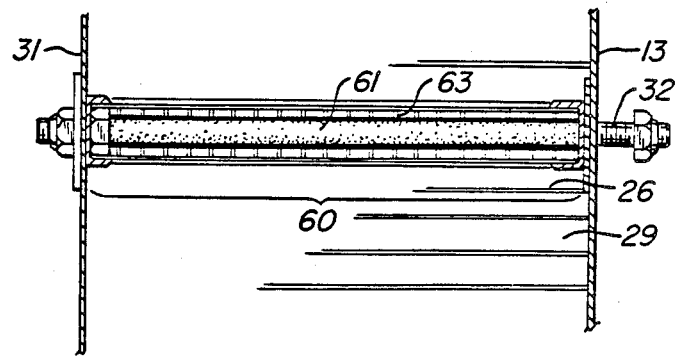
FIG._3a.
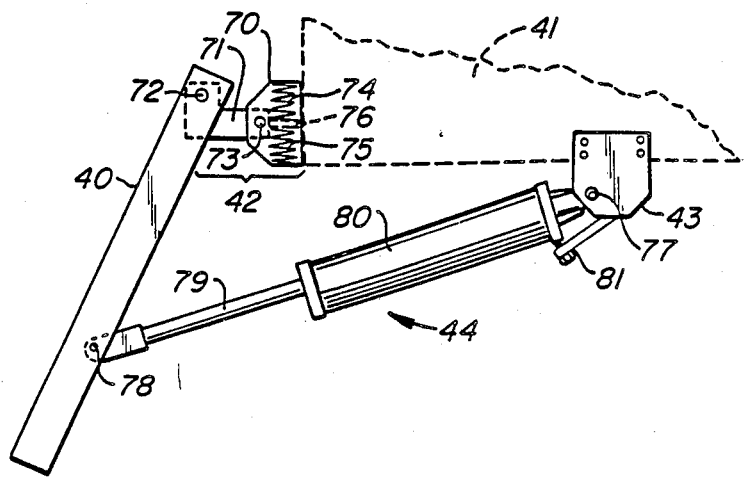
FIG._4.

VEHICLE MOUNTING SYSTEM FOR IMPACT ABSORPTION APPARATUS

This is a division of application Ser. No. 06/691,253 filed Jan. 14, 1985, now U.S. Pat. No. 4,658,941.

BACKGROUND OF THE INVENTION

1. Field Of The Invention

This invention relates to apparatus and means for minimizing occupant injury and vehicle damage during rear end collisions. In particular, this invention relates to structures for attachment to the rear of a vehicle prone to collision by another vehicle from the rear, for the purpose of absorbing and dissipating the impact energy of the collision. The subject of this invention is the mounting of such structures to the rear of the vehicle.

2. Description Of The Prior Art

Highway maintenance activities, particularly on a high speed or heavily traveled highway, pose a high risk of danger to both motorists and maintenance workers. For this reason, slow moving or parked trucks with raised signs or brightly flashing lights are frequently used to alert the public to the closing of lanes where maintenance is being done. Despite the signs and lights, however, inattentive motorists still occasionally crash into the backs of such trucks, causing severe damage to one or both vehicles and injury to maintenance workers and vehicle occupants.

The problem has been lessened significantly by the use of deformable structures mounted to the rear of the truck (which may thus be termed a carrier vehicle), the structures containing materials capable of absorbing the energy of an impact by compression. Such materials have included foams, fibrous materials and open cellular structures.

The deformable structure to which the present invention is addressed is a rectangular box, the interior of which consists of an array of elongate cells extending in the longitudinal direction of the carrier vehicle and thus the expected direction of impact, such that the cell walls absorb and dissipate the energy of impact by collapsing longitudinally. The box is in fact divided longitudinally into a series of sections, the cells in each section arranged in bundles with voids in between, and the proportion of bundle area to void area and hence the energy absorbing capacity of each section increasing as the distance between the section and the rear of the carrier vehicle decreases. One method of achieving density variations is by grouping these cells in discrete bundles with voids between adjacent bundles. The size of the bundles increases and the void space accordingly decreases as the sections successively approach the carrier vehicle, with the forwardmost section (i.e., that closest to the carrier vehicle) containing no voids at all but rather a continuous array of cells. The result is a graduated resistance upon impact, which lessens the jolt of the impact and hence the severity of damage to the vehicles and injury to the occupants.

In addition to being deformable upon impact, the structure must be sufficiently light for towing by the truck or vehicle upon which it is mounted without severely increasing the power requirements of the vehicle or shifting its center of gravity. The structure is accordingly constructed of lightweight materials. Unfortunately, such structures are fragile and therefore highly susceptible to vibrations encountered during transit of the vehicle to and from the job site, notably the vibrations which occur as the vehicle passes over potholes and uneven road surfaces, and as the vehicle backs out of driveways. These vibrations frequently cause localized crushing of the cell structure, and opening of the bonds or welds used to secure the cell ends to the bulkheads separating the sections.

This problem has been alleviated somewhat by the addition of tension cables stretched diagonally between the front and rear ends of the structure. Typically, crossed cables extend from the bulkhead at the rear of the forwardmost section through the void spaces (which are aligned in the remaining sections) to the rear wall of the structure to enhance the rigidity of the sections. The front end of each cable is secured through connecting hardware to a bolt which extends through the entire length of the forwardmost section (which contains a continuous array of cells) and extends through the front wall of the structure, further bolting the front wall to a frame by which the structure is mounted on the vehicle itself. By passing through the cells in the longitudinal direction, the bolt unfortunately creates further localized vibrations in the cells immediately adjacent to it, causing high stress concentrations and weakening of the cell structure.

Additional bolts which do not support cables are generally present to further secure the structure to the mounting frame. Like the cable-supporting bolts, these bolts pass through the entire length of the forwardmost section of the structure, and vibrate during vehicular motion to cause disintegration of the cell network immediately adjacent.

A further source of destructive vibration are the brackets by which the frame, to which the structure is mounted, is secured to the rear of the vehicle. The vibrations, of course, are transmitted through the frame to the cell structure in general, with the greatest destructive effect occurring in the forwardmost section around the mounting bolts passing therethrough.

Since the impact absorption structures are generally unwieldy and are mounted at one end only, vehicular vibrations are magnified as they are transmitted to the structure, and the combination of these stress concentrations and weak points renders the entire structure particularly susceptible to disintegration before and between uses.

The disintegration problem is aggravated even further by the use of rotatable mountings which permit the structure to be tilted upward by as much as 60° from the horizontal. Tilting is done when the apparatus is not in use, for purposes of maneuvering the vehicle and discouraging persons from sitting or placing objects on the structure. At high tilt angles, vehicle vibrations cause even greater disintegration of the cells in the regions surrounding the bolts.

SUMMARY OF THE INVENTION

An improvement in the mounting features of the impact absorption apparatus is provided, relating to both the mounting of the bolts referred to above and the bracket by which the frame is secured to the vehicle. In particular, it has been discovered that improvements to both the bolt mount and the bracket work in conjunction with one another in reducing the shock damage to the apparatus.

The bolt mount is improved by replacing a portion of the cellular array in the forwardmost deformable section of the structure with an insert comprised of transverse cells in the region surrounding the bolt. The bolt thus passes through the cells in the insert in the direction transverse to the axes of these cells, and is bonded to the cell walls accordingly. This has been found to provide an unexpected improvement in the durability of the metallic bonds in the neighboring cell network and in the durability of the entire unit, when such inserts are used around the cable-supporting bolts. A further unexpected improvement has been found when such inserts are used around the additional (non-cable-supporting) bolts as well: the cell structure around all bolts is more durable rather than just around the additional bolts.

The bracket is improved by being divided into two sections, one rigidly mounted to the vehicle, and the other pivotally mounted to the first but stabilized with respect thereto by a shock absorbing means, preferably a spring or spring assembly which absorbs torsional impulses arising from the vibrations of the vehicle. In preferred embodiments, the pivotal portion of the bracket is secured to the attenuator mounting frame in pivotal manner at a second fulcrum near the top of the frame, and an extendable pivot rod connects the base of the frame to the vehicle. The entire frame and hence the attenuator structure can thus be rotated upward when not in use, for purposes of transport and storage.

BRIEF DESCRIPTION OF THE DRAWINGS

FIG. 1 is an exploded perspective view of an impact absorption apparatus and vehicle mount components designed for use therewith, viewed from the upper rear right corner, as one embodiment of the present invention.

FIG. 2a is a top view of the impact absorption structure of FIG. 1 showing the transverse cell inserts to which the mounting bolts are bonded. FIGS. 2b and 2c are cross-sectional views taken along lines BB and CC of FIG. 2a, respectively.

FIGS. 3a and 3b, respectively, are top and side views of the transverse cell inserts and mounting bolts shown in FIG. 2c.

FIG. 4 is a side view of the support bracket and entire rotating support mechanism for the frame, for the embodiment shown in FIG. 1.

DETAILED DESCRIPTION OF THE INVENTION

In FIG. 1, an illustrative embodiment of the present invention in its various aspects may be viewed in conjunction with both the impact attenuator box and the rear end of the vehicle to which it is mounted. Since the features of the invention will be specifically adapted in each case to the attenuator box to which it is attached, the description of the invention which follows will be preceded by a review of the structure of the attenuator box shown in the drawing.

The attenuator box 10 is comprised of a series of sections 11, arranged longitudinally, defined by a series of separating bulkheads 12, and terminating in a front wall 13 and a rear wall 14. The sides, top and bottom of the structure are wrapped with a skin 15 which buckles and collapses readily upon impact. Lights 16 are affixed to the rear of the box, to function as backup lights or warning lights equivalent to those found on the rear of other vehicles. Power to these lights is supplied by a cable 17 extending from the rear of the vehicle to which the box is mounted. For further precaution, the rear wall of the box bears broad warning stripes 18 to further draw the attention of motorists approaching from the rear. A jack 19 on the rear wall, combined with two on the front wall (not shown), all containing caster wheels, are included for ease of manipulation of the attenuator box during mounting to or removal from the vehicle.

The interior of each of the sections 11 of the attenuator box is comprised of a network of cells 25, defined by intersecting intercellular walls 26 spanning the length of the section and extending from one bulkhead 12 to the next (or to the front or rear wall). The resulting cells are elongate in shape, the axis of each and all side walls running parallel to the longitudinal direction of the vehicle and to the direction of impact. Although the cells may be of any configuration or size, hexagonal cross-sections are preferred. A convenient configuration is the honeycomb-type shape and arrangement shown. The cells may be hollow or filled with foam. The ends of the cells are bonded to the bulkheads 12. As an optional feature, some or all of the cells may be precrushed slightly (i.e., the ends are slightly collapsed) to avoid the high initial compressive force which would otherwise be required to cause collapse of the cells.

As mentioned above, the attenuation effect is achieved by arranging the cells in bundles 27, separated by voids 28. As the sections successively approach the front of the box (and thus the rear of the vehicle to which the box is mounted), the bundles 27 increase in width and the voids 28 accordingly decrease, resulting in an overall increase in cell area in the direction of impact. In the forwardmost section 29, the bundles are merged into a continuous array of cells, with no voids other than those in the interior of each cell, thus providing the maximum cell density, and thus the maximum capacity for absorption of impact energy, in the entire attenuator box. The attenuation effect may be enhanced by varying the thickness of the material used in the cell walls.

In all sections of the box other than the forwardmost section 29, the void spaces 28 are in longitudinal alignment from one section to the next, permitting passage of the tension cables (discussed below) between the forwardmost bulkhead and the rear wall of the box.

It will be noted that the individual cells are of uniform configuration and size in the embodiment shown in FIG. 1, and that the attenuation effect is achieved by varying the proportions of the internal space occupied by the cell bundles and the void spaces, respectively. Alternatively, the attenuation effect may be achieved by varying the cell dimensions or materials of construction.

Tension cables 30 are stretched diagonally between the forwardmost bulkhead 31 and rear wall 14 of the attenuator box. A bolt 32 extends from the front end of each cable 30 through the forwardmost section 29 to the front wall 13 of the box. The portion of the forwardmost section 29 through which each bolt passes is an insert 33 in which the cells are transverse rather than longitudinal.

The bolts 32 further secure the entire attenuator box 10 to a frame 40 adapted to be secured to the front wall 13 of the box. Additional bolts (not shown), similar to the cable-supporting bolts 32 although at other locations along the width of the forwardmost section 29, pass through the section to the frame 40 to further secure the attenuator box 10. Although the additional bolts are not visible in the drawing, their positions are indicated by the holes 34 in the frame 40 through which the bolts pass. Inserts (also not shown in this drawing) are placed around each of these bolts as well.

The frame 40 is mounted to the rear of the vehicle 41 through a pair of upper brackets 42 and a pair of lower brackets 43. The upper brackets are connected directly to the upper portion of the frame 40, while the lower brackets are connected to the lower portion of the frame through a pair of extendable arms 44, providing for rotation of the frame around the upper brackets 42.

More detailed views of the mounting features, including the bolts 32, the brackets 42 and 43 and the extendable arms 44 are found in the remaining figures.

Turning now to FIG. 2a, it may be seen that the cell bundles 27, although of varying width, are aligned to ensure that as each one compresses under impact, it exerts its full force within the cross-section of the bundle in the adjacent section to the front. The voids 28 provide straight passages on both right and left sides of the structure for the cables 30 to pass through. Holes or slots (not shown) in each of the bulkheads 12 are appropriately positioned to allow passage of the cables.

As evident from FIG. 2b, two cables 30 are arranged on each side of the structure, one extending diagonally down toward the rear and the other extending diagonally up toward the rear and crossing the first. The cables are looped at each end, the front end passing through an angled bracket 50, and the rear end passing through a U-bolt 51. The angled bracket 50 at the forward end is secured to the forwardmost bulkhead 31 by the same bolt 32 which passes through the forwardmost deformable section 29 of the structure, thereby anchoring the tension cable to the forwardmost bulkhead 31. The U-bolt 51 in turn anchors the cable to the rear wall 14 of the structure.

The portion of the cell structure in the forwardmost section 29 through which the cable supporting bolt 32 passes is a discrete region or insert 33 in which the cells are aligned in the transverse direction rather than the longitudinal direction. The insert may be of any size or shape, provided that it encompasses the entire portion of the bolt between the front wall 13 and the forwardmost bulkhead 31 of the structure and still leaves sufficient longitudinal cell space for an impact-absorbing effect. In the embodiment shown, a single elongated insert encompasses both bolts.

Returning to FIG. 2a, additional mounting bolts 35 which do not support cables are positioned along the width of the structure, as mentioned above. Each of these bolts is surrounded by a transverse cell region or insert 36, performing the same function as those surrounding the cable-supporting bolts 32. Again, these may be of any size or shape. As evident from FIG. 2c, the embodiment shown in the drawings has a separate insert 36 for each bolt, extending but a short distance into the structure.

FIGS. 3a and 3b provide detailed views of the bolt and transverse cell region at the upper right corner of FIG. 2c. In the embodiment shown in these drawings, the bolt 32 is threaded for its entire length. The inner portion 60 of the bolt, i.e., that portion lying between the forwardmost bulkhead 31 and the front wall 13 of the attenuator box, is sheathed in a tube 61, to which it is bonded by an adhesive material. The sheathed bolt passes through a cell array 62 formed of longitudinal cells whose axes and intersecting walls 63 are directed transverse to the direction of the continuous cell array making up the remainder of the forwardmost section 29 of the attenuator box. In the embodiment shown, the cells are oriented with axes horizontal. The tube 61 surrounding the bolt 32 thus passes through the walls 63 of these transverse cells in a generally perpendicular direction, bonded to each. The transverse cell array 62 fully surrounds the sheathed bolt 61, and in the embodiment shown, is itself interposed between rigid panels 64 which are bonded to the edges of the transverse cells 62 on the inside and to intersecting walls 26 of the longitudinal cells. These panels 64 are preferably of more rigid material than the cell walls for purposes of structural strength. Accordingly, a non-collapsible plastic or plastic composite material may be used such as, for example, plastic-impregnated fabric.

As stated above, the dimensions of the insert are not critical, provided that the volume consumed by the insert does not substantially lessen the impact absorbing and dispersing effect of the overall longitudinal cell array in the forwardmost section 29. The shape of the overall transverse cell array is likewise noncritical, provided that it fully encases the sheathed bolt. A convenient structure is that shown in the drawings, which is in the form of a flat rectangular slab or sandwich (wherein the cell array 62 is sandwiched between sheets of the encasing skin 64), encompassing either a single bolt as in FIG. 2c, or a pair of bolts vertically aligned as in FIG. 2b. In the embodiment shown, both types of inserts are vertically disposed.

As mentioned in the longitudinal cells, the shape and size of the transverse cells 62 are not critical and may vary widely. A honeycomb-type cell structure is preferred for lightness and strength, and the dimensions may be the same as or similar to those of the longitudinal cell array.

Returning to FIG. 1, the mounting of the attenuation box to the vehicle frame 41 is achieved by a frame 40 mounted to the front wall 13 of the attenuation box. The frame 40 is in turn mounted to the vehicle frame 41 by pivot brackets 42 located toward the top of the frame 40, and extension arms 44 at the base of the frame 40. These brackets and extension arms permit upward rotation of the frame when the attenuator box is not in use. The brackets and extension arms are shown in pairs in FIG. 1, although any number and arrangement may be used which provides stability and permits rotation of the frame 40 about the horizontal axis only. When a paired arrangement as shown in FIG. 1 is used, a cross bar 45 is preferably included to add strength and stability.

The structural details of the brackets and extendable arm are seen in the side view in FIG. 4. The brackets include an upper bracket 42 and a lower bracket 43, the former for direct connection to the support frame 40 near the top thereof, providing the axis for the upward rotation of the frame and attenuator box, and the latter to support the extendable arm 44 which is attached near the bottom of the frame governing its rotation. The upper bracket 42 is in two sections, a first section 70 rigidly mounted to the rear of the vehicle, and a second section 71 mounted to the first in pivotal manner and also pivotally mounted directly to the frame 40. Thus, the upper bracket has pivotal capability at two fulcrums 72 and 73. The first fulcrum 72 is positioned at the rear end of the pivotal portion 71 of the bracket, connecting this portion with the box-mounting frame 40, and serving as the point of rotation for the frame. The second fulcrum 73 is the joint between the first and second sections of the bracket (70 and 71, respectively).

A pair of springs 74 and 75, one positioned above and one below the free end 76 of the pivot arm, stabilizes the latter in the horizontal position and also absorbs torsional impulses exerted on the latter due to vibrations of the vehicle. The torsional impulses will be exerted by the weight of the frame 40 and the attenuator box 10 as the moving vehicle passes over irregularities in the road surface. These impulses will be exerted in the vertical direction on the frame-mounted end of the pivot arm 71. In the embodiment shown in the drawing, the free end 76 of the pivot arm is interposed between springs 74 and 75, which resist the pivoting of the pivot arm 71 due to the torsional impulses. The springs thus absorb shock which might otherwise be transmitted to the bolt 32 and other features of the attenuator structure and its mounting. Although the spring arrangement shown is particularly convenient, alternative arrangements may be devised, using single or multiple springs, disposed horizontally, vertically, or at an angle.

The lower bracket 43 is rigidly mounted to the vehicle body and has a single fulcrum 77, for attachment of the extendable rod 44 whose other end is pivotally secured to the box-mounting frame 40 near its base, at a pivot joint 78. In the embodiment shown in the drawing, the extendable rod 44 is comprised of a piston 79 and cylinder 80, which may be actuated by any conventional means (not shown). A hydraulic actuation system is particularly convenient. As the piston 79 extends rearward from the cylinder 80 (toward the left in the drawing), the frame 40 will rotate upward around its upper fulcrum 72, with the base of the frame moving to the rear (toward the left in the drawing). Pivoting will also occur at pivot points 77 and 78. An adjustable stop 81 extending from the lower bracket 43 limits the degree of rotation of the piston 80, and hence the range of rotation of the frame 40 and attenuator box to which it is attached, at the downward end of the range.

The materials of construction are not critical. Conventional materials commonly used in impact absorption structures of the type described in this application may be used. Aluminum is particularly preferred. Bonding of the various parts, including cell walls to bulkheads and the like, may be achieved by conventional means such as, for example, crush welding. Common metal adhesives such as, for example, epoxy adhesives, may also be used.

The foregoing description is offered for illustrative purposes only. Numerous modifications and variations, still falling within the spirit and scope of the invention as claimed hereinbelow, will be readily apparent to those skilled in the art.

What is claimed is:

1. In a mount for securing an impact absorption apparatus to the rear of a vehicle by an extendible arm and a pivotal bracket, wherein said impact absorption apparatus comprises a plurality of deformable sections aligned in the longitudinal direction of said vehicle, at least one of said deformable sections comprising an array of elongate cells having axes parallel to said longitudinal direction, said elongate cells being defined as longitudinal cells and defined by intersected intercellular walls spanning the length of said deformable section, and said deformable sections are separated by bulkheads and terminate in a front wall and a rear wall, and said front wall of said impact absorption apparatus is secured to a vehicle-mounting frame by at least one bolt extending in said longitudinal direction through a forwardmost deformable section, the improvement in which:

(a) said pivotal bracket is comprised of
 (i) a fixed portion adapted for rigid mounting to the rear of said vehicle,
 (ii) a pivot arm pivotally mounted at a first fulcrum to said fixed portion and pivotally mounted at a second fulcrum to said vehicle-mounting frame, and
 (iii) a pair of springs connecting said fixed portion to said pivot arm and arranged such that when said fixed portion is mounted to the rear of said vehicle, said springs are vertically disposed, one above and one below said pivot arm, causing said pivot arm to oscillate vertically around a horizontal position in response to torsional impulse; and (b) the portion of each said bolt located inside said forwardmost deformable section is bonded to an array of elongate cells having axes perpendicular to said longitudinal cells.

* * * * *